(12) United States Patent
May (10) Patent No.: US 9,631,694 B2
(45) Date of Patent: Apr. 25, 2017

(54) MEASURING RANGE SHIFT FOR SMART AIR SPRINGS

(71) Applicant: STEMCO Kaiser Incorporated, Millington, MI (US)

(72) Inventor: Lutz May, Berg (DE)

(73) Assignee: STEMCO KAISER INCORPORATED, Millington, MI (US)

( * ) Notice: Subject to any disclaimer, the term of this patent is extended or adjusted under 35 U.S.C. 154(b) by 341 days.

(21) Appl. No.: 14/085,298

(22) Filed: Nov. 20, 2013

(65) Prior Publication Data

US 2014/0138886 A1 May 22, 2014

(30) Foreign Application Priority Data

Nov. 21, 2012 (EP) .................................... 12193653

(51) Int. Cl.

| | |
|---|---|
| *F16F 9/04* | (2006.01) |
| *F16F 9/32* | (2006.01) |
| *B60G 11/27* | (2006.01) |
| *G01B 7/02* | (2006.01) |
| *G01B 7/14* | (2006.01) |

(52) U.S. Cl.
CPC ............ *F16F 9/3292* (2013.01); *B60G 11/27* (2013.01); *F16F 9/04* (2013.01); *G01B 7/02* (2013.01); *G01B 7/14* (2013.01); *B60G 2202/152* (2013.01); *B60G 2202/1524* (2013.01); *B60G 2204/111* (2013.01); *B60G 2400/252* (2013.01); *B60G 2401/17* (2013.01)

(58) Field of Classification Search
CPC .. F16F 9/04; F16F 9/3292; G01B 7/02; G01B 7/102
See application file for complete search history.

(56) References Cited

U.S. PATENT DOCUMENTS

| | | | |
|---|---|---|---|
| 3,997,835 A | 12/1976 | Ando et al. ...................... | 324/34 |
| 4,071,820 A | 1/1978 | Mushinsky ...................... | 324/61 |
| 4,160,204 A | 7/1979 | Holmgren et al. ........... | 324/207 |

(Continued)

FOREIGN PATENT DOCUMENTS

| | | | | |
|---|---|---|---|---|
| DE | 10 2006 017 275 A1 | 10/2007 | ....... | B60G 17/01933 |
| DE | 10 2008 064 647 A1 | 2/2010 | ........... | B60G 17/019 |

(Continued)

*Primary Examiner* — Bradley King
(74) *Attorney, Agent, or Firm* — Perkins Coie LLP (57) ABSTRACT

An air spring height sensor (100) is provided which comprises a receiver (101) for receiving a height signal and an evaluation unit (200). The receiver is adapted for being mounted to an air spring so as to sense a height signal with respect to said air spring. The evaluation unit comprises an input terminal (201), a multiplexer (240), a first signal branch (210) starting from the input terminal and terminating at a first multiplexer input (241), and a second signal branch (220) starting from the input terminal and terminating at a second multiplexer input (242). The first signal branch includes a first amplitude limiter (211) being adapted to cut off the amplitude above a predetermined first threshold value. The multiplexer is adapted to select a measurement signal from one of the inputs of the multiplexer.

18 Claims, 4 Drawing Sheets

(56) References Cited

U.S. PATENT DOCUMENTS

| | | | | |
|---|---|---|---|---|
| 5,280,238 | A * | 1/1994 | Tsuchiya | G01D 5/246 324/207.24 |
| 5,446,379 | A * | 8/1995 | Machi | G01N 27/82 324/207.17 |
| 6,097,183 | A * | 8/2000 | Goetz | G01D 5/145 324/207.12 |
| 6,172,499 | B1 * | 1/2001 | Ashe | F41G 3/225 324/207.12 |
| 6,528,989 | B1 * | 3/2003 | Hansen | G01B 7/003 324/207.12 |
| 2008/0134727 | A1 * | 6/2008 | May | G01D 5/145 68/12.02 |
| 2008/0266021 | A1 * | 10/2008 | Van Bezooijen | H03H 7/40 333/32 |
| 2008/0290861 | A1 * | 11/2008 | Niwa | G01D 5/202 324/207.16 |
| 2012/0056616 | A1 | 3/2012 | May | 324/207.15 |
| 2012/0093209 | A1 * | 4/2012 | Schmidt | H04L 27/2624 375/224 |

FOREIGN PATENT DOCUMENTS

| | | | | |
|---|---|---|---|---|
| EP | 1845278 | A1 | 10/2007 | ....... B60G 17/01933 |
| EP | 2366972 | A2 | 9/2011 | .............. G01B 7/00 |
| WO | WO 9500818 | | 1/1995 | .............. G01B 7/14 |

* cited by examiner

MEASURING RANGE SHIFT FOR SMART AIR SPRINGS

This application claims benefit of European Patent Application Serial No. EP 12193653.8, filed on Nov. 21, 2012. The teachings of European Patent Application EP 12193653.8 are incorporated herein by reference in their entirety.

FIELD OF THE INVENTION

The invention relates to distance measurement and in particular to a distance sensor, an air spring height sensor and an air spring for a vehicle having an air spring height sensor or a distance sensor.

BACKGROUND OF THE INVENTION

Height or distance measurement has a wide variety of possible applications. However, the environment where the height measurement is being made can present a wide variety of challenges. This is particularly the case in situations where height or distance measurements are being made in automotive applications. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

EP 2 366 972 and United States Patent Publication No. 2012/0056616 A1 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

It may be seen as an objective technical problem to provide a distance sensor for an air spring which allows an improved accuracy when determining the working stroke of an air spring.

The object of the present invention is solved by the subject matter of the independent claims, wherein further embodiments are incorporated in the dependent claims and the following specification.

According to an aspect of the invention, an air spring height sensor is provided which comprises a receiver for receiving a height signal and an evaluation unit, wherein the receiver is adapted for being mounted to an air spring so as to sense a height signal with respect to said air spring. The evaluation unit comprises an input terminal, a multiplexer, a first signal branch starting from the input terminal and terminating at a first multiplexer input, and a second signal branch starting from the input terminal and terminating at a second multiplexer input. The first signal branch includes a first amplitude limiter being adapted to cut off the amplitude above a predetermined first threshold value. The multiplexer is adapted to select a measurement signal from one of the inputs of the multiplexer.

The height signal as described above and hereinafter may in particular be inversely proportional to the height of the air spring, i.e. to the working stroke of the air spring. In other words, the greater the distance to be measured is, i.e. the current working stroke of an air spring, the smaller or lesser will the height signal value be.

The height signal may in particular be determined by a receiving coil of the receiver, wherein the receiving coil is adapted to receive a magnetic field generated by a transmitting coil. The height signal may then be determined by an electric current which is induced in the receiving coil by the magnetic field. The closer the transmitting coil and the receiving coil are arranged with respect to each other, the higher will the electric current induced in the receiving coil be. Thus, the induced electric current in the receiving coil is a parameter or a criterion for the distance between the transmitting coil and the receiving coil.

In case the value of the height signal has no linear course or linear plot when changing the distance or height to be measured, the distance determination may be of fluctuating accuracy. In other words, when the height signal changes to a great degree in dependence of the changed distance between transmitting coil and receiving coil, small changes in the distance may be detected as the height signal may change to a large degree, whereas when the height signal changes to a small degree in dependence of the changed working stroke of the air spring, small changes in the working stroke lead to small changes in the height signal and may thus be subject to uncertainty. In other words, in a distance range or working stroke in which the first derivative of the height signal over the distance is high, the distance and in particular distance changes may be detected with higher accuracy compared to a distance range in which the first derivative of the height signal over the distance is low.

The air spring height sensor as described above and hereinafter enables providing of height signals in a first distance range or value range of the height signal to a first multiplexer input and height signals in a second distance range or value range of the height signal to a second multiplexer input such that the signals may be processed in a different manner, for example by applying an amplification to one of the height signals, provided to the first multiplexer input or the second multiplexer input.

Thus, for an improved height measurement accuracy of an air spring, those height signal of the two signals may be selected for determining the height of the air spring which provides a signal form with a higher value of the first derivative of the signal form. The air spring height sensor as described above and hereinafter may in particular be used for wireless distance sensing and in more particular for distance measurement using a transmitting coil and a receiving coil, wherein a magnetic field generated by the transmitting coil and received by the receiving coil is the criterion for determining the distance between the transmitting coil and the receiving coil which may both be mounted to moving elements of an air spring which moves towards and away from each other in an operating state of the air spring.

According to an embodiment of the invention, the first branch between the first amplitude limiter and the first multiplexer input includes a digital programmable filter.

The digital programmable filter may be adapted to perform digital signal processing to the signal transmitted via the first branch. The signal of the first branch may be smoothed by the digital programmable filter by filtering out frequencies above a given frequency, i.e. the filter acts as a low pass filter. The digital programmable filter may also be adapted as a band pass.

According to a further embodiment of the invention, the first branch between the digital programmable filter and the first multiplexer input includes a logarithmic amplifier.

The logarithmic amplifier may in particular be adapted to linearize the output signal of the digital programmable filter. In one embodiment the logarithmic amplifier is adapted to amplify the height signal such that the first derivative of the height signal is constant in a given distance range of the height signal. Thus, the accuracy of the height measurement may be increased as the sensitivity of the height signal to distance changes is constant in a given range of height values.

According to a further embodiment of the invention, the second signal branch includes a second amplitude limiter being adapted to cut off the amplitude above a predetermined second threshold value being higher than the first threshold value.

Both the second amplitude limiter and the first amplitude limiter are adapted to cut off a height signal exceeding the first threshold value in order to avoid to large signal amplitude which may cause signal distortion at the subsequent modules.

According to a further embodiment of the invention, the evaluation unit comprises a third signal branch starting between the first amplitude limiter and the digital programmable filter and terminating at a third multiplexer input.

The third signal branch enables to branch off the amplified height signal of the first branch at the output of the first amplitude limiter such that the branched off signal may be provided to the third multiplexer input with an amplification but without a logarithmic amplification.

This enables to choose one of the multiplexer inputs and the according height signal depending on the value range of the output signal of the receiver, i.e. depending on the output value of the height signal provided by the receiver, or the measured distance or working stroke of the air spring.

According to a further embodiment of the invention, the first signal branch between the first amplitude limiter and the digital programmable filter includes a signal amplifier.

Thus, the first multiplexer input is being provided with a height signal which is being amplified in a first stage, filtered by a digital programmable filter in a second stage and amplified by a logarithmic amplifier in a third stage. The second multiplexer input is being provided with the original height signal from the output of the receiver, wherein the height signal's value is subjected to an amplitude limitation only. The third multiplexer input is being provided with a limited height signal which is being amplified by the signal amplifier.

The first multiplexer input, second multiplexer input, and third multiplexer input are part of a multiplexer which is adapted to provide one of the height signals of the first multiplexer input, the second multiplexer input, and the third multiplexer input to a multiplexer output for further processing of the height signal.

The multiplexer may be adapted to lead through one of the three input values dependent on the value of the original height signal at the output of the receiver. In case the original height signal is in a first value range, the multiplexer leads through the height signal of the second multiplexer input. In case the original height signal is in a second value range, the multiplexer leads through the height signal of the third multiplexer input. In case the original height signal is in a third value range, the multiplexer leads through the height signal of the first multiplexer input.

In this scenario, the first value range of the original height signal indicates a small distance which means that the provided height signal has a relatively high value such that amplification or other further processing of the height signal may not be necessary in the first value range. The second value range indicates a medium distance which means that the provided height signal is decreased compared to the first value range as the height signal is inversely proportional to the distance. In particular, the height signal may decrease exponentially in one embodiment of the invention. The second value range may require an amplification of the height signal to facilitate the detection and determination of small distance changes even though the sensitivity of the receiver is decreased with an increased measuring distance. The third value range indicates a large measuring distance whereas the original height signal provided by the receiver may indicate almost no changes with small distance changes. In the third value range a logarithmic amplification may be necessary in order to prepare and treat the original height signal as to detect small distance changes even though the measuring distance is relatively high.

In one embodiment, the value ranges may be set up as follows: the first value range may correspond to a measuring distance between 1 mm and up to 50 mm; the second value range may correspond to a measuring distance between 50 mm and up to 150 mm; the third value range may correspond to a measuring distance between 150 mm and up to 400 mm.

According to a further embodiment of the invention, the air spring height sensor further comprises a height measuring signal transmitter and a controlling device. The height measuring signal transmitter is adapted to transmit a height measuring signal such that the receiver upon transmitting receives a signal representing a distance between the height measuring signal transmitter and the receiver. The controlling device is adapted for controlling a carrier frequency of the height measuring signal.

The transmitter is adapted for generating a magnetic field wherein the receiver is adapted to receive the magnetic field such that an electric current is induced in the receiver and in particular in a receiver coil. In one embodiment, the transmitter may also comprise a coil which may be a wounded coil with or without a core and wherein the core may comprise iron or a ferromagnetic material. Depending on the distance between the transmitter and the receiver the electric current induced in the receiver coil may vary as described above in more detail.

The controlling device may be adapted to drive or trigger the height measuring signal transmitter and in particular the generation of the magnetic field by the transmitting coil. The controlling device may further be adapted to detect noise signals in the received height signal, wherein the carrier frequency may be changed in case the noise on the used carrier frequency overlays or superimposes the height signal. In other words, in case the signal to noise ratio of the measured height signal is to large, the carrier frequency of the height measuring signal may be changed.

According to a further embodiment of the invention, the controlling device is adapted to switch the carrier frequency of the height measuring signal, to compare output signals of the multiplexer upon different frequencies of the height measuring signal, and to evaluate the compared output signals of the multiplexer so as to eliminate disturbed signals.

The air spring height sensor may thus be used in an environment in which other radio signals may be present as the controlling device may be able to identify and eliminate disturbed height signals.

According to a further embodiment of the invention, the controlling device is adapted to control the digital programmable filter upon reception of an output signal of the multiplexer. Thus, the controlling device may be able to adapt the filter properties of the digital programmable filter as to adapt the filtered height signal.

According to a further aspect of the invention, an air spring is provided which comprises a first mounting element being adapted for being mounted to a first vehicle portion, a second mounting element being adapted for being mounted to a second vehicle portion, an air volume limited by a resilient belly having a first edge and a second edge, which belly with the first edge is sealed to the first mounting element and with the second edge is sealed to the second mounting edge, and an air spring height sensor as described above and hereinafter. The receiver of the air spring height sensor is mounted to the air spring so as to sense a height signal with respect to at least one of the first mounting element and the second mounting element.

The air spring may be used as a spring in a wheel suspension of a vehicle. The air spring height sensor in the air spring facilitates an accurate measurement of the working stroke of the air spring with a high sensitivity of the output signal of the air spring height sensor about a large measurement range or working stroke of the air spring.

According to one embodiment of this invention, the receiver is mounted to one of the first mounting element and the second mounting element so as to sense a height signal with respect to the other one of the first mounting element and the second mounting element. Thus, the air spring height sensor enables a distance measurement between the first mounting element and the second mounting element of the air spring.

According to a further aspect of the invention, a distance sensor is provided which comprises a receiver for receiving a distance signal and an evaluation unit. The evaluation unit comprises an input terminal, a multiplexer, a first signal branch starting from the input terminal and terminating at a first multiplexer input, and a second signal branch starting from the input terminal and terminating at a second multiplexer input, wherein the first signal branch includes a first amplitude limiter being adapted to cut off the amplitude above a predetermined first threshold value.

The distance sensor allows providing a distance signal via the first signal branch and via the second signal branch to the multiplexer, wherein the multiplexer leads through one of the provided signals in dependency of the signal value. In case the signal value exceeds the threshold value, the cut off signal is lead through by the multiplexer. In case the signal value does not exceed the threshold value, the original signal value is lead through by the multiplexer.

These and other aspects of the present invention will become apparent from and elucidated with reference to the embodiments described hereinafter.

The reference numerals used herein are as follows:
  1 air spring
  2 first vehicle portion
  3 second vehicle portion
  10 first mounting element
  20 second mounting element
  30 belly
  31 first edge
  32 second edge
  40 working stroke
  50 height measurement signal
  50A first amplification stage
  50B second amplification stage 50C third amplification stage
100 air spring height sensor
101 receiver
102 height measuring signal transmitter
200 evaluation unit
201 input terminal
210 first signal branch
211 first amplitude limiter
212 signal amplifier
213 digital programmable filter
214 logarithmic amplifier
220 second signal branch
221 second amplitude limiter
230 third signal branch
240 multiplexer
241 first multiplexer input
242 second multiplexer input
243 third multiplexer input
250 analog-digital converter
260 controlling device
261 signal output
263 feedback line

DETAILED DESCRIPTION OF THE INVENTION

Figure 1:
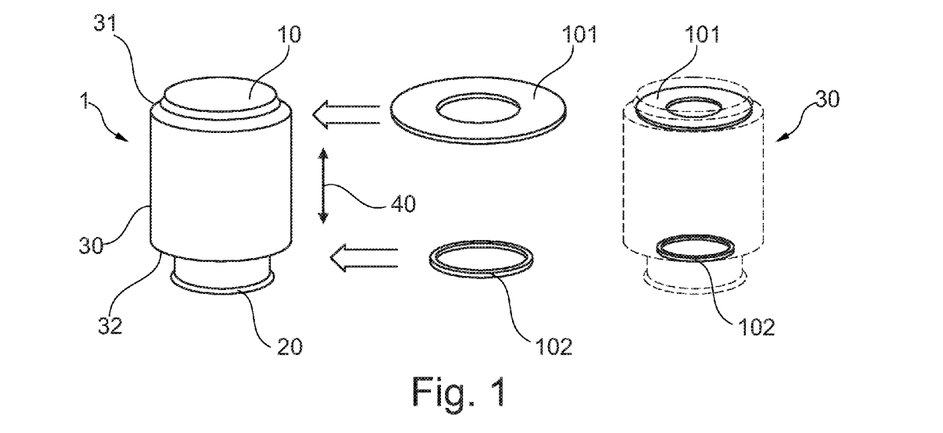
FIG. 1 illustrates an air spring according to an exemplary embodiment of the invention.

FIG. 1 illustrates an air spring 1 with a first mounting element 10 and a second mounting element 20. The air spring further comprises a belly 30 with a first edge 31 and a second edge 32. The first edge 31 of the belly 30 is mechanically interconnected with the first mounting element 10 and the second edge 32 is mechanically interconnected with the second mounting element 20. The belly encloses an air volume such that the working stroke 40 of the air spring represents a movement of one of the first mounting element 10 and the second mounting element 20 towards the other one of the first mounting element 10 and the second mounting element 20.

A receiver 101 in form of a coil and a height measuring signal transmitter 102 are located within the air volume of the air spring as indicated by the air spring illustrated in dotted lines. The receiver 101 is located close to the first mounting element 10 of the air spring and the height measuring signal transmitter 102 is located close to the second mounting element 20 of the air spring. Both, the receiver and the height measuring signal transmitter may be designed as coreless coils such that a working stroke 40 of the air spring is not reduced by these devices which are located within the air volume of the air spring.

FIG. 1 shows the air spring and the air spring height sensor in both the mounted and the unmounted state, wherein on the left side of the drawing the unmounted state and on the right side of the drawing the mounted state is depicted.

The air spring as described above and hereinafter may in particular be a smart air spring with an air spring height sensor as described above and hereinafter as air spring level unit or height measurement system. The air spring may in particular be an air spring with intelligent sensor and actuator functions. One of the important features is the integrated air spring height sensor. The function of the air spring height sensor is it to measure with reasonable accuracy the current absolute axial position of the air spring, i.e. the distance between the first mounting element and the second mounting element. With other words: what is the current length of the air spring. Such a sensor solution may require its own, application specific electronics which will be described in more detail below.

The air spring height sensor as described above and hereinafter may offer the following features: reduced or no sensitivity to electromagnetic interferences (EMI), insensitive or fully compensated for the potential effects caused by temperature and temperature fluctuations or variations, reasonably high signal resolution for the targeted measurement range, no shortening of the original operating or working stroke of the air spring, low electric current consumption, fast signal response with a wide signal bandwidth range, low or no emissions of electromagnetic interferences, insensitive to metallic objects of different kinds that may be placed near the air spring or placed inside the air spring, wherein in the latter limits of maximum size and maximum mass of the metallic object apply, insensitive to changes of humidity, dirt and dust to a certain extent.

The air spring height sensor as described above and hereinafter is not limited to air spring applications. Wherever a large measurement stroke of a linear-position-sensor is required, this described electronics solution may be applicable. Large measurement stroke means that the signal amplitude ratio may change in exponential ratio, for example in a range greater than 1:100. Examples include, but are not limited to, height and position changes in vehicle suspension system including all types of vehicles, like trucks, passenger cars, rains, planes, motor bikes, etc., control of industrial processing equipment like tooling, milling, drilling, mixing, filling, shifting, sorting, like luggage sorting and handling at airports, parcel sorting at the mail service, etc., test equipment like flight simulator, engine test bed, furniture reliability tests, sports equipment testing, etc., large scale, indirect load measurement systems like weight-on-beam design, large scale mining equipment like oil drilling, tunneling, steering and position control systems in ships (rudder position), planes (flaps, rudder,). Other applications for this application may be measuring accurately the distance to a metallic object, like when the engine (locomotive) of a train is coupling to a rail-road wagon, or when a pushing-truck at the airport is automatic or semi-automatic coupling to the front-wheel of a plain. When implementing an air spring height sensor as described above and hereinafter into a smart air spring system, it may be important not to shorten the actual mechanical stroke of the air spring.

There may exist several different ways to integrate an air spring height sensor as described above and hereinafter into an air spring. FIG. 1 shows one of these possibilities, where the height measuring signal transmitter 102 is placed at one end of the air spring body, i.e. at the second mounting element 20 (like the bottom) and the receiver 101 is placed at to other end of the air spring body, i.e. at the first mounting element 10. Other design solutions are that the height measuring signal transmitter and the receiver are placed at one and the same side (not shown in FIG. 1), for example.

Figure 2:
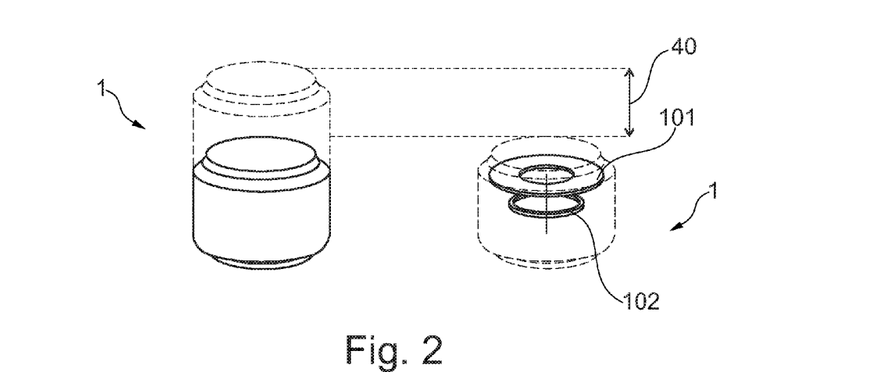
FIG. 2 illustrates an air spring according to a further exemplary embodiment of the invention.

FIG. 2 illustrates an air spring 1 in a first state or in an uncompressed state on the left side of the drawing and the air spring 1 in a second state or in a compressed state on the right side of the drawing. The difference between the length of the air spring in the first state and in the second state corresponds to the maximum working stroke of the air spring. As the height measuring signal transmitter and the receiver are designed as coils with a minimum extension in direction of the working stroke, the working stroke of the air spring is almost not or not reduced when arranging the air spring height sensor as described above and hereinafter within the air volume of the air spring.

A manufacturer's specification of an air spring may define the usable working stroke range 40 which is shown in connection with the first state and the second state of the air spring in FIG. 2. In particular, the user of the air spring should not alter the air spring as to inflate it any higher or deflate it any lower than described in the manufacturer's specification. Going beyond the specified "Min/Max" positions may result in damages to the rubber belly of the air spring. In any case, to avoid damaging the air spring height sensor components when the air spring may get fully deflated, the individual sensing components height measuring signal transmitter and receiver have to be spaced sufficiently so that they never crash into each other at the minimum distance or when the air spring takes the second state. In a preferred embodiment, the air spring height sensor as described above and hereinafter may be built in such way that the height measuring signal transmitter and the receiver may come very close to each other when the air spring is fully deflated or collapsed.

The second state is the state in which the sensor signal transfer is most efficient and therefor the largest height signal can be expected at the output of the passive or active working signal receiver. This signal may also be called the original or untreated height signal.

When moving from the second state to the first state, the distance between the height measuring signal transmitter and the receiver steadily increases such that the original height signal is decreasing, wherein the decreasing may occur exponentially.

Figure 3:
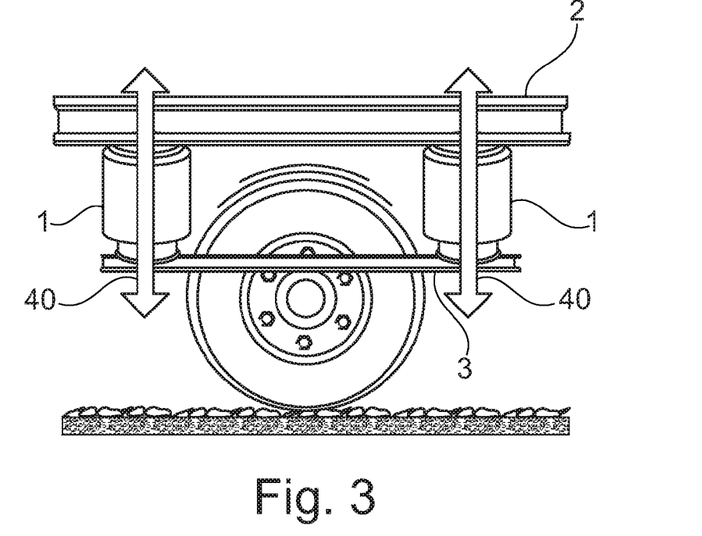
FIG. 3 illustrates a wheel suspension with an air spring according to a further exemplary embodiment of the invention.

FIG. 3 illustrates a wheel suspension of a vehicle with two air springs 1 as described above and hereinafter. The second vehicle portion 3, i.e. the movable part of the wheel suspension which is mounted to the wheel, is adapted to move along the arrows 40, which correspond to the measuring distance and the working stroke of the air springs, wherein one mounting element of the air spring is attached to the second vehicle portion. The other one of the mounting elements of the air spring is mounted to the first vehicle portion 2.

Figure 4:
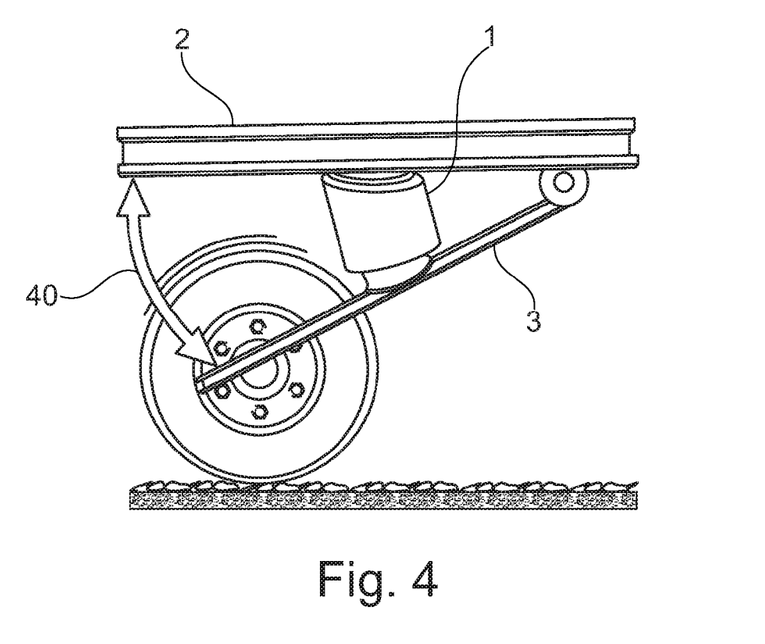
FIG. 4 illustrates a wheel suspension with an air spring according to a further exemplary embodiment of the invention.

FIG. 4 illustrates an alternative wheel suspension of a vehicle with one air spring 1, wherein one of the mounting elements of the air spring is attached to the movable second vehicle portion 3 and the other one of the mounting elements is attached to the first vehicle portion 2. The second vehicle portion is rotatably movable around a hinge which mechanically interconnects the first vehicle portion and the second vehicle portion.

Figure 5A:
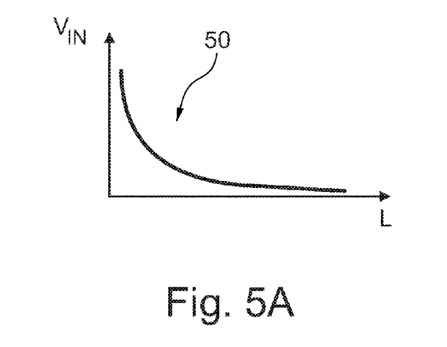
FIG. 5A illustrates a height signal form of an air spring height sensor according to a further exemplary embodiment of the invention.

FIG. 5A illustrates the height signal 50 as a voltage Vin over the distance L between the height measuring signal transmitter and the receiver, wherein the voltage Vin decreases exponentially with increasing distance L. FIG. 5A illustrates the original height signal as provided at the output of the receiver of the air spring height sensor as described above and hereinafter.

The height signal form shown in FIG. 5A illustrates a very steep curve of the original or untreated sensor signal. The signal amplitude may be dropping by a factor of 1000 for the desired measurement range or working stroke. Within the very first few cm of distance reduction or movement of the air spring (starting at the "near deflated" position or in the second state where the air spring working stroke is at the minimum point), the signal amplitude Vin is dropping rapidly by near 50%. At the near "Max" point of the air spring working stroke or in the first state, the signal amplitude changes are the very smallest as the signal gain curve is here near flat.

For standard signal processing electronics designs it may be challenging to guarantee a reasonable high measurement signal quality over the entire measurement range. Under normal circumstances the signal to noise ratio and the temperature drift of the sensor signal will be at its worst when the air spring is inflated to near the "Max" position or in the first state.

Figure 5B:
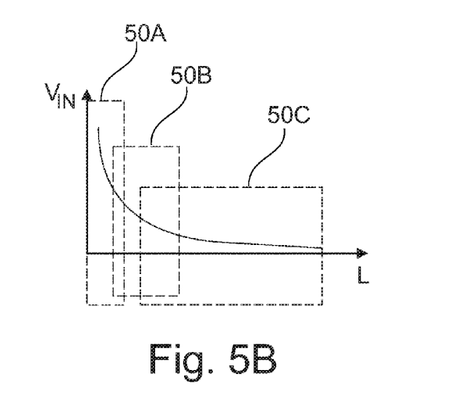
FIG. 5B illustrates a height signal form of an air spring height sensor according to a further exemplary embodiment of the invention.

FIG. 5B illustrates the height signal 50 shown in FIG. 5A wherein the signal is partitioned into a first amplification stage 50A, a second amplification stage 50B, and a third amplification stage 50C.

In the first amplification stage 50A the first derivative of the height signal may be high enough such that a distance change or a change of the L-value leads to a sufficient change of Vin which means that a movement of the receiver may be detected with reasonable accuracy.

In the second amplification stage 50B the first derivative of the height signal is lower than in the first amplification stage 50A. The height signal may require to be amplified in this distance range or value range of Vin, respectively such that changes of L lead to higher changes in Vin when the height signal has been amplified.

In the third amplification stage 50C the height signal is nearly flat such that the signal may require a logarithmic amplification in order to detect sufficient signal changes in Vin when L changes.

The air spring height sensor as described above and hereinafter enables the different treatment of the amplification stages such that a height measurement over the complete working stroke or distance range may be carried out with high and constant accuracy even though the height signal Vin is inversely proportional to the measured distance and decreases exponentially with increasing distance.

The curve shown in FIG. 5B suggests three signal amplification stages 50A, 50B, and 50C. The height signal that is in the segment 50C will be amplified with the highest amplification factor, while the sensor signal in the segment A may need not to be amplified at all.

It should be noted that also more than three amplification stages are possible. With an increasing number of amplification stages the height signal value range may be treated more accurate. Any number from one additional stage to more than ten stages is possible here, whereby minimum two stages (resulting into a 2-signal-channel electronics design) to maximum four stages (resulting into a 4-signal-channel electronics design) may be the optimum for most typical applications. When choosing one amplification stage only (without any additional amplification stage), then there is no other stage to choose from or to switch between them.

Figure 6:
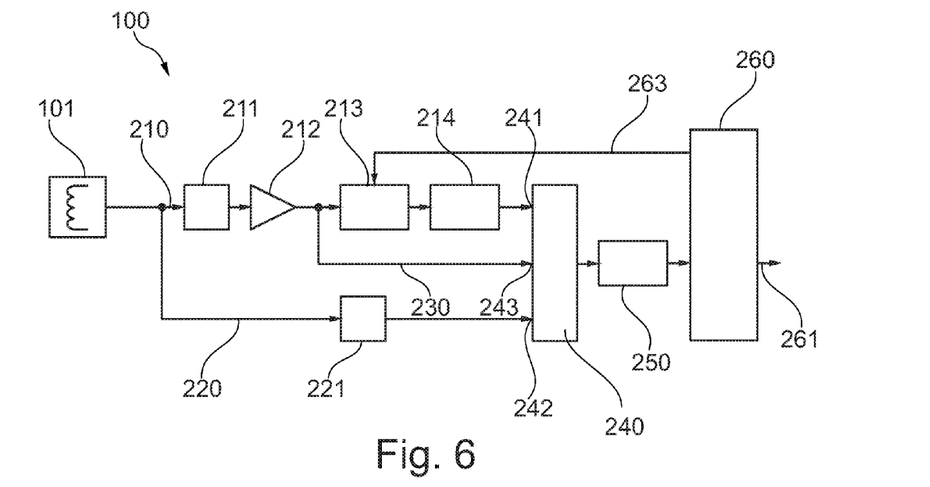
FIG. 6 illustrates an air spring height sensor according to a further exemplary embodiment of the invention.

FIG. 6 illustrates an air spring height sensor 100 for providing three amplification stages of the original height signal as indicated in FIG. 5B.

The receiver 101 provides the original height signal via the first signal branch 210 to the first amplitude limiter 211 and via the second signal branch 220 to the second amplitude limiter 221. The second amplitude limiter 221 is connected to the second multiplexer input 242 of the multiplexer 240 and provides the amplitude limited original height signal to the second multiplexer input 242.

The first amplitude limiter 211 provides the height signal to the signal amplifier 212 for applying an amplification factor of up to 10 to the height signal. Other amplification factors are applicable as well. Subsequently, the amplified height signal is provided first via the third signal branch to the third multiplexer input 243 and second to the digital programmable filter 213. The digital programmable filter 213 provides the height signal to the logarithmic amplifier 214 which further provides the logarithmic amplified height signal to the first multiplexer input 241.

Thus, the height signal in the first amplification stage 50A is provided to the multiplexer via the second branch 220, the second amplification stage 50B is provided to the multiplexer via the third branch 230, and the third amplification stage 50C is provided to the multiplexer via the first branch 210.

Depending on the value of Vin, the multiplexer leads through the value of the according multiplexer input to the analog-digital converter 250 and further to the controlling device 260. It should be noted that for further processing of the height value lead through by the multiplexer the information of the applied amplification to the height signal is required in order to determine the correct distance or height.

The controlling device 260 is adapted to control the digital programmable filter 213 via the feedback line 263, whereas the band pass frequencies for the filter process may be transmitted to the digital programmable filter in case such amendments to the filter are necessary in order to reduce the signal to noise ratio, for example.

FIG. 6 shows the signal pass of an exemplary embodiment of the air spring height sensor, beginning with the signal receiver stage and ending with a micro-controller device at the right side. The use of a micro-controller is optional and there are other solutions available when digital signal processing or digital control algorithms are required (as they are required to operate the digital filter).

The first signal branch 210 may be considered the main signal path and shows the following functions (starting from left to right): a signal amplitude limiter 221, a signal amplifier 212, a digital programmable filter 213, a logarithmic (or exponential gain curve) amplifier 214, a multiplexer 240, and an analogue-to-digital signal converter 250.

The signal amplitude limiter 211 is for preventing running the following circuit into saturation as too large of a signal amplitude would do, and with this may cause signal distortion.

A signal amplifier 212 may be required only when a multi-channel signal path design is used (a multi-channel means more than one channel, such as two or five), wherein the signal amplification factor may be within the range 3 to 10 (this may apply to a three signal-channel design).

A digital programmable filter 213 is in form of a band pass, such as a switch-mode capacitor filter, for example, can be tuned to any desired frequency and may eliminate the needs for a relative large number of passive and active electronics components (as required when building an analogue signal filter). In addition the actual and effective filter frequency may not vary when the operational temperature is changing. Nor may such filter design be dependent from the absolute tolerance of the individual passive electronic components (in comparison to a traditional analogue circuit filter design).

The air spring height sensor as described above and hereinafter may require electronic signal filter circuitry, which traditionally may be designed and produced using discreet analogue components (capacitors, inductors, resistors, transistors, OpAmps, etc.). To ensure functional stability it may be important that the critical components are manufactured with small tolerances only (1% resistors or better, for example) and that circuit compensation is included to deal with the changes in the operational temperature. A much more advanced solution may be the use of a digital programmable filter (in particular like those that use switch-capacitor-circuits). Those circuits are self-compensated, and can be freely programmed to any desired filter frequency and filter type. With very few exceptions a modern switch-mode-capacitor-filter may work almost like a "perfect filter". The filter center frequency (either: band pass, low-pass, or high pass) may be set by a clock frequency. Any clock frequency can be used within a manufacturer specified range. Such clock frequency can be provided by a Micro-controller 260 and is stabilized (kept accurate) by the controllers timing circuit (like a crystal or temperature compensated resonator). So, there may be no temperature drift, or component tolerance offset. Another benefit when using digital filter techniques may be that the entire system can switch in an instant between different operational frequencies. This may be important when trying to implement a frequency hopping solution, i.e. the function of using different carrier frequencies. The frequency hopping solution may be one possible approach when trying to improve the air spring height sensor stability in case of potentially presents EMI (Electro Magnetic Interferences) signals.

The benefits when using switched-mode-capacitor filters may be: drastically reduction in numbers of required individual components to build the filter (cost and space issue); eliminating the need for small tolerance components (cost and stability issue); insensitiveness or insensitivity to changes of the operating temperature range (stability issue).

The ability to change the signal filter frequency may be important when trying to implement the function of different carrier frequencies. This means that the actual operational frequency of the entire air spring height sensor can be altered when interfering signals may block entirely the usage of, or interfere partially with a certain frequency.

A logarithmic (or exponential gain curve) amplifier 214 for the purpose of this active device is to linearize the sensors signal output and preferably cover an amplitude changing range of 1:1000.

The air spring height sensor as described above and hereinafter may have a very large measurement voltage range of Vin from several volts to fractions of mV. Because of the very large measurement voltage range of the air spring height sensor, a standard, linear operating amplifier may limit the distance measurement range. Alternatively a very costly, high performance amplifier may need to be used that has an excellent signal-to-noise ratio specification. For this application as described above and hereinafter a logarithmic gain amplifier stage 214 may be very beneficial as the signal gain is, by definition, much higher when the input signal is very small, and the signal gain is reduced when the input signal is getting larger and larger. Another benefit when using a logarithmic amplifier may be that the sensor output signal is already linearized. Meaning that the "linearized" amplifier output signal is proportional to the measurement distance between the height measuring signal transmitter and the receiver. Potentially this means no further signal linearization is required.

The Multiplexer 240 (MUX) is a device which will switch between the three different signal channels (in this example), obtained at the first multiplexer input 241, the second multiplexer input 242, and the third multiplexer input 243.

The analogue-to-digital signal converter 250 is for a signal ratio of 1:1000 a ten-bit ADC may be required. To improve the signal quality a 12 or 14 bit ADC may be better, but may also increase the costs for the system.

In many instances, a micro-controller unit (MCU) may include the functions of the MUX and ADC already such that these components may be integrated on an MCU.

Figure 7A:
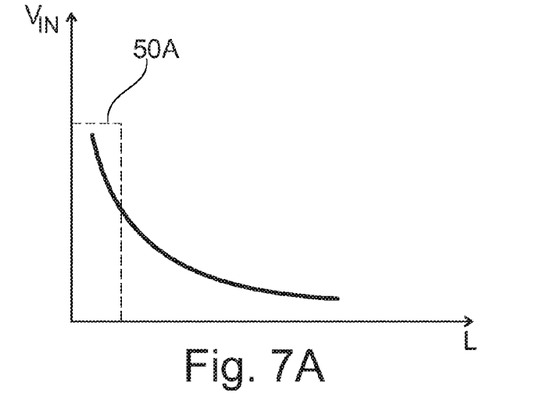
FIG. 7A illustrates a height signal form of an air spring height sensor according to a further exemplary embodiment of the invention.
Figure 7B:
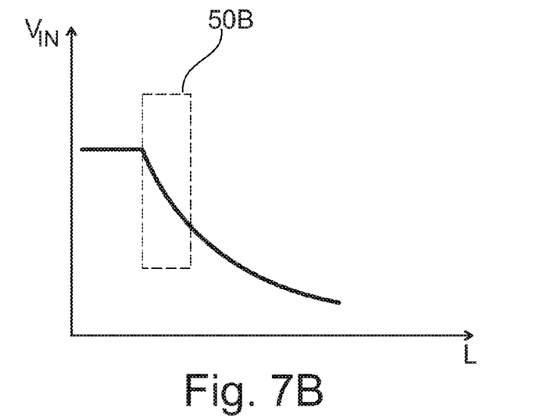
FIG. 7B illustrates a height signal form of the third multiplexer input of an air spring height sensor according to a further exemplary embodiment of the invention.
Figure 7C:
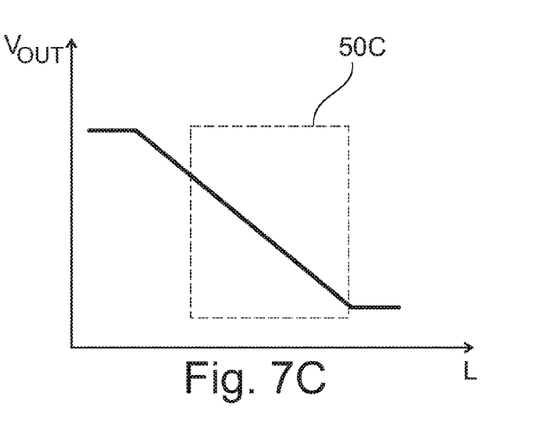
FIG. 7C illustrates a height signal form of the first multiplexer input of an air spring height sensor according to a further exemplary embodiment of the invention.

FIGS. 7A, 7B, and 7C illustrate the height signal at the second multiplexer input 242 via the second signal branch 220 (FIG. 7A), at the third multiplexer input 243 via the third branch 230 (FIG. 7B), and at the first multiplexer input 241 via the first branch 210 (FIG. 7C), respectively.

Furthermore, each of the FIGS. 7A, 7B, and 7C illustrates the according amplification stage 50A, 50B, and 50C, respectively. The multiplexer 240 is adapted to lead through the Vin value of the multiplexer input which is assigned to the amplification stage corresponding to the current distance value.

Thus, the height signal Vin lead through by the multiplexer ensures a high first derivative and according an accurate distance measurement.

This application claims benefit of European Patent Application Serial No. EP 12193653, filed on Nov. 21, 2012. While certain representative embodiments and details have been shown for the purpose of illustrating the subject invention, it will be apparent to those skilled in this art that various changes and modifications can be made therein without departing from the scope of the subject invention.

What is claimed is:

1. An air spring height sensor comprising:
a receiver for receiving a height signal; and
an evaluation unit,
wherein the receiver is adapted for:
being mounted to an air spring so as to sense the height signal with respect to said air spring, and
providing the height signal to the evaluation unit,
wherein the evaluation unit comprises:
an input terminal,
a multiplexer,
a first signal branch starting from the input terminal and terminating at a first multiplexer input, and
a second signal branch starting from the input terminal and terminating at a second multiplexer input,
wherein the first signal branch includes a first amplitude limiter being adapted to cut off the amplitude above a predetermined first threshold value,
wherein the second signal branch includes a second amplitude limiter which is adapted to cut off the amplitude above a predetermined second threshold value, wherein the second threshold value is higher than the first threshold value, and
wherein the multiplexer is adapted to select a measurement signal from one of the inputs of the multiplexer for leading through based on a value of the height signal.

2. The air spring height sensor according to claim 1, wherein the first branch between the first amplitude limiter and the first multiplexer input includes a digital programmable filter.

3. The air spring height sensor according to claim 2, wherein the first branch between the digital programmable filter and the first multiplexer input includes a logarithmic amplifier.

4. The air spring height sensor according to claim 2, wherein the evaluation unit comprises a third signal branch starting between the first amplitude limiter and the digital programmable filter and terminating at a third multiplexer input.

5. The air spring height sensor according to claim 2, wherein the first signal branch between the first amplitude limiter and the digital programmable filter includes a signal amplifier.

6. The air spring height sensor according to claim 1, wherein the air spring height sensor further comprises:
a height measuring signal transmitter, and
a controlling device,
wherein the height measuring signal transmitter is adapted to transmit the height signal such that the receiver upon transmitting receives a signal representing a distance between the height measuring signal transmitter and the receiver, and
wherein the controlling device is adapted for controlling a carrier frequency of the height signal.

7. The air spring height sensor according to claim 6, wherein the controlling device is adapted to switch the carrier frequency of the height signal to compare output signals of the multiplexer upon different frequencies of the height signal, and to evaluate the compared output signals of the multiplexer so as to eliminate disturbed signals.

8. The air spring height sensor according to claim 6, wherein the controlling device is adapted to control the digital programmable filter upon reception of an output signal of the multiplexer.

9. The air spring height sensor according to claim 7, wherein the controlling device is adapted to control the digital programmable filter upon reception of an output signal of the multiplexer.

10. An air spring comprising:
a first mounting element being adapted for being mounted to a first vehicle portion;
a second mounting element being adapted for being mounted to a second vehicle portion;
an air volume limited by a resilient belly having a first edge and a second edge, which belly with the first edge is sealed to the first mounting element and with the second edge is sealed to the second mounting edge;
the air spring height sensor according to claim 1,
wherein the receiver is mounted to the air spring so as to sense the height signal with respect to at least one of the first mounting element and the second mounting element.

11. An air spring comprising:
a first mounting element being adapted for being mounted to a first vehicle portion;
a second mounting element being adapted for being mounted to a second vehicle portion;
an air volume limited by a resilient belly having a first edge and a second edge, which belly with the first edge is sealed to the first mounting element and with the second edge is sealed to the second mounting edge;
the air spring height sensor according to claim 2,
wherein the receiver is mounted to the air spring so as to sense the height signal with respect to at least one of the first mounting element and the second mounting element.

12. An air spring comprising:
a first mounting element being adapted for being mounted to a first vehicle portion;
a second mounting element being adapted for being mounted to a second vehicle portion;
an air volume limited by a resilient belly having a first edge and a second edge, which belly with the first edge is sealed to the first mounting element and with the second edge is sealed to the second mounting edge;
the air spring height sensor according to claim 3, wherein the receiver is mounted to the air spring so as to sense the height signal with respect to at least one of the first mounting element and the second mounting element.

13. An air spring comprising:
a first mounting element being adapted for being mounted to a first vehicle portion;
a second mounting element being adapted for being mounted to a second vehicle portion;
an air volume limited by a resilient belly having a first edge and a second edge, which belly with the first edge is sealed to the first mounting element and with the second edge is sealed to the second mounting edge;
the air spring height sensor according to claim 4,
wherein the receiver is mounted to the air spring so as to sense the height signal with respect to at least one of the first mounting element and the second mounting element.

14. An air spring comprising:
a first mounting element being adapted for being mounted to a first vehicle portion;
a second mounting element being adapted for being mounted to a second vehicle portion;
an air volume limited by a resilient belly having a first edge and a second edge, which belly with the first edge is sealed to the first mounting element and with the second edge is sealed to the second mounting edge;
the air spring height sensor according to claim 5,
wherein the receiver is mounted to the air spring so as to sense the height signal with respect to at least one of the first mounting element and the second mounting element.

15. An air spring comprising:
a first mounting element being adapted for being mounted to a first vehicle portion;
a second mounting element being adapted for being mounted to a second vehicle portion;
an air volume limited by a resilient belly having a first edge and a second edge, which belly with the first edge is sealed to the first mounting element and with the second edge is sealed to the second mounting edge;
the air spring height sensor according to claim 9,
wherein the receiver is mounted to the air spring so as to sense the height signal with respect to at least one of the first mounting element and the second mounting element.

16. The air spring according to claim 10, wherein the receiver is mounted to one of the first and the second mounting element so as to sense the height signal with respect to the other one of the first mounting element and the second mounting element.

17. A distance sensor comprising:
a receiver for receiving a distance signal; and
an evaluation unit;
wherein the evaluation unit comprises:
    an input terminal,
    a multiplexer,
    a first signal branch starting from the input terminal and terminating at a first multiplexer input, and
    a second signal branch starting from the input terminal and terminating at a second multiplexer input,
wherein the first signal branch includes a first amplitude limiter being adapted to cut off the amplitude above a predetermined first threshold value,
wherein the receiver is adapted to provide the distance signal to the evaluation unit,
wherein the evaluation unit comprises a signal amplifier which is arranged in the first signal branch and which is adapted to apply an amplification factor to the distance signal provided to the multiplexer,
wherein the amplification factor applied to the first signal branch is higher than an amplification factor applied to the second signal branch, and
wherein the multiplexer is adapted to select a measurement signal from one of the inputs of the multiplexer for leading through based on a value of the distance signal.

18. The distance sensor of claim 17 comprising:
wherein the distance signal is a height signal, and
wherein the receiver is adapted for being mounted to an air spring so as to sense the height signal with respect to the air spring.

* * * * *